United States Patent [19]

Endo et al.

[11] Patent Number: 4,943,398
[45] Date of Patent: Jul. 24, 1990

[54] METHOD FOR MANUFACTURING A FUSED CAST REFRACTORY

[75] Inventors: Shigeo Endo; Haruo Kawashima, both of Narita; Kimio Hirata, Katori; Yasuo Saito, Narita; Takao Uchiya, Sawara; Hideo Yanagi, Kashiwa, all of Japan

[73] Assignee: Toshiba Monofrax Co., Ltd., Chiba, Japan

[21] Appl. No.: 120,174

[22] Filed: Nov. 12, 1987

Related U.S. Application Data

[63] Continuation of Ser. No. 839,280, Mar. 13, 1986, abandoned.

[30] Foreign Application Priority Data

Mar. 15, 1985 [JP] Japan .................................. 60-50366
Apr. 8, 1985 [JP] Japan .................................. 60-72569

[51] Int. Cl.$^5$ ........................ B29C 33/38; B29C 39/02
[52] U.S. Cl. ........................................ 264/82; 164/7.1; 164/7.2; 264/511; 264/220; 264/332; 425/388
[58] Field of Search ................. 264/82, 510, 511, 517, 264/220, 225, 332; 425/388; 65/17, 24, 26, 66; 249/62, 105, 112, 115; 164/7.1, 7.2

[56] References Cited

U.S. PATENT DOCUMENTS

| | | | |
|---|---|---|---|
| 2,079,101 | 5/1937 | Benner et al. | 501/128 |
| 2,154,153 | 4/1939 | Easter et al. | 264/332 |
| 2,513,785 | 7/1950 | Browne | 264/517 |
| 3,789,907 | 2/1974 | Nakata et al. | 164/7 |
| 3,843,301 | 10/1974 | Hijikata et al. | 264/510 |
| 3,868,241 | 2/1975 | Felice et al. | 65/134 |
| 3,955,266 | 5/1976 | Honami et al. | 264/511 |
| 4,028,455 | 6/1977 | Ueda et al. | 264/510 |
| 4,157,109 | 6/1979 | Toyoda et al. | 264/517 |
| 4,160,003 | 7/1979 | Kozuka et al. | 264/517 |
| 4,167,206 | 9/1979 | Terada et al. | 164/7.2 |
| 4,269,799 | 5/1981 | Rockwell | 264/85 |
| 4,383,963 | 5/1983 | Ohashi et al. | 264/332 |

FOREIGN PATENT DOCUMENTS 808194 2/1981 U.S.S.R.
1164173 9/1969 United Kingdom ................ 264/332

Primary Examiner—Jan H. Silbaugh
Assistant Examiner—Mary Lynn Fertig
Attorney, Agent, or Firm—Foley & Lardner, Schwartz, Jeffery, Schwaab, Mack, Blumenthal & Evans

[57] ABSTRACT

A method for manufacturing a fused cast refractory article including the steps of pouring a molten refractory material into a cavity of a mold including a casting sand held by a negative pressure applied through the sand and against a thermoplastic film which surrounds the mold cavity, casting and cooling off the refractory material, wherein the negative pressure is maintained after the casting. The mold includes an upper mold portion including a frame, a casting sand, and a thermoplastic film; a bottom mold portion including a frame, a casting sand and a thermoplastic film; and a cavity defined by the thermoplastic film between the upper and bottom mold portion and having an inlet opening.

13 Claims, 1 Drawing Sheet

METHOD FOR MANUFACTURING A FUSED CAST REFRACTORY

This application is a continuation of application Ser. No. 839,280, filed March 13, 1986, now abandoned.

BACKGROUND OF THE INVENTION

This invention relates to a method for manufacturing a fused cast refractory such as an alumina-zirconia-silica series, alumina series or alumina-chromia series and a mold used for manufacturing the same.

In general, alumina-zirconia-silica electrofused cast refractories are referred to as AZS refractories and are widely used in the glass industry. AZS refractories are made through the steps of fusing or melting a blended raw material of plural composition in an arc furnace, casting the fused or melted material in a mold formed by silica sand and a binder for the sand, and thereafter gradually cooling (annealing) the cast product in alumina powder.

In order to form the mold, water glass (sodium silicate) is sometimes used as the binder for the silica sand. However, the water glass causes such drawbacks as sintering of the silica sand with the cast product, insufficient mold strength or strength deterioration due to absorption of moisture from the air, and formation of scattered small pores in the cast product by penetration of absorbed moisture into the cast product. Further, when water glass is used as the binder, the silica sand used here is difficult to regenerate for reuse, because it is exposed to a high temperature of about 1900° C. for a long time during casting and annealing. Also, if once used, the silica sand shows reduced refractory properties due to the alkali residue from the water glass. Therefore, the silica sand cannot be reused.

An organic binder such as phenol resin or furan resin exhibits high binding strength with little deterioration over prolonged periods. However, the organic binders have effects detrimental to the product quality such as carbon diffusion from the organic binder onto the surface of the cast product, penetration of the gas generated from the organic binder into the cast product, and consequential formation of scattered small pores. Particularly recently the quality of refractories for use in a glassmelting furnace has become extremely important for the manufacture of high quality glass, for example, electronic glass such as cathode ray tubes and photomasks. If the refractories cause formation of bubbles in the glass at the glass/refractory interface of reaction, the glass cannot be used for electronic purpose.

Many theories and empirical rules have been proposed concerning the causes of bubble formation in molten glass. These theories teach the following requirements of the refractory for use in a glass-melting furnace:

(1) The refractory should have a non-porous dense structure.
(2) The refractory should contain no iron or other metals, and also very little oxide of such metals.
(3) The refractory compositions should maintain a high degree of oxidation.

In these requirements, there is no established method for measuring the degree of oxidation. At present, the only means to meet the third requirement is to maintain the highest possible state of oxidation at each step of melting, casting and gradual cooling, or annealing.

With a view to preventing the adverse effects on the cast product quality which result from an organic binder, it has been proposed in Japanese Published patent application Ser. No. 58-179536 to eliminate the adverse effects by advance blending of an oxidizing agent with the mold mixture to oxidize carbon and thereby prevent the carbon from the binder from lowering the state of oxidation of the refractory composition by reduction. However, oxidizing agents are expensive, and the chemicals require extreme care in handling. Also, the use of the organic binder invites the problem of $NO_x$ exhaust.

On the other hand, in order to cast a molten material the composition of which requires casting temperatures exceeding 2000° C., such as an alumina or alumina-chromia electrofused cast refractory, a graphite plate is used as a mold material of desired shape and size. The graphite mold is used because no other material has been found which can resist the above high temperatures and the extremely rapid rate temperature rise. However, the graphite mold is very expensive, and normally a mold thereof shows local oxidation wear after three or four times of use and must be reprocessed before the next use. Consequently, the cast of mold material is a very large proportion of the production cost of the electrofused cast product.

An alumina refractory shows less tendency to be reduced during casting in comparison with an alumina-zirconia-silica refractory. However, because the mold is made of graphite, the alumina refractory reacts with the graphite of the mold during casting and forms many undesirable pores immediately below the refractory surface. Thereby, after surface processing of the refractory, the pores are exposed. Thus, the cast product has a serious quality defect. In certain cases, the refractory cannot be used unless the surface portion is cut off to a depth of as much as 50 mm.

Furthermore, the cast product must be released from the graphite mold at the earliest stage possible and buried in an alumina powder for gradual cooling. Otherwise, the cast product would develop fractures. The whole operation must be carried out under extremely high temperatures and therefore is severe.

SUMMARY OF THE INVENTION

It is an object of this invention to provide a method for manufacturing a fused cast refractory having better quality, such as an alumina-zirconia-silica refractory, alumina refractory or alumina-chromia refractory.

Another object of this invention is to provide a method for manufacturing a fused cast refractory wherein no scattered small pores are formed immediately below the refractory surface.

Another object of this invention is to facilitate a process for producing a fused cast refractory wherein it is no longer necessary to release the cast article from the mold under high temperatures, as required in the conventional process using a graphite mold.

Another object of this invention is to provide an improved mold suitable for manufacturing a fused cast refractory.

In accomplishing the foregoing objects, there has been provided according to one aspect of the present invention a method for manufacturing a fused cast refractory, comprising the steps of forming a casting mold having a mold cavity by outlining the cavity with a thermoplastic film and maintaining a casting sand surrounding the cavity by applying a negative pressure through the sand against the film, wherein the sand consists essentially of sand; pouring molten refractory material into the mold cavity to produce a cast refractory article; maintaining the negative pressure for a period of time following the pouring step; and cooling the cast refractory article.

According to another aspect of the present invention, there has been provided a mold used for manufacturing a fused cast refractory comprising an upper mold portion comprising a frame having an exhaust port, a casting sand contained in the frame, and a thermoplastic film contacting the top surface of the casting sand; a bottom mold portion comprising a frame having an exhaust port, a casting sand contained in the frame, and a thermoplastic film contacting the top surface of the casting sand; a thermoplastic film defining a mold cavity in the casting sand between the upper mold portion and the bottom mold portion, the mold cavity having an inlet opening extending to the top surface of the casting sand in the upper mold portion; and means for applying a negative pressure to the exhaust ports.

Further objects, features and advantages of the present invention will become apparent from the description of preferred embodiments which follows when considered together with the attached figures of drawings.

DETAILED DESCRIPTION OF THE PREFERRED EMBODIMENTS

The refractory in this invention is preferably an electrofused cast refractory such as an alumina-zirconia-silica series, alumina-chromia series or alumina series, which is fused or melted in an arc furnace.

In this invention, a silica sand or Bayer-processed alumina is used for the casting sand. The particles of the casting sand are of high purity and each individual particle is preferably an aggregate of a large number of fine particles, rather than a single, dense particle. The particle size should be adequate for maintaining a suitable degree of gaspermeability. The presence of excessively fine particles is undesirable. When Bayer-processed alumina is used for the casting sand, the alumina particles preferably contain no more than about 10% by weight of aggregate particles of a size smaller than about 50 microns.

The mold retains a suitable degree of gas permeability, when the negative pressure is applied against the thermoplastic film. Also, the mold is strong and has a heat insulation adequate to serve as the gradual cooling agent for the cast product. No binder for the casting sand is used, and thus many problems caused by the use of an organic or inorganic binder are eliminated. Furthermore, because the thermoplastic film is melted or burned away by contact with the molten refractory material at a high temperature, the surface of the cast refractory can be maintained at a sufficiently oxidized state for any desired time.

If necessary, the whole of the mold may be placed in an airtight enclosure of suitable size filled with an oxidizing atmosphere, for example, oxygen, thereby rendering the atmosphere sucked into the mold in a highly oxidized state. Accordingly, the vacuum or negative pressure applied to the mold is continued for a period of time after the pouring step for several reasons, i.e., maintaining stability of the shape of the casting sand until the refractory material has become sufficiently hardened, exhausting the vaporized thermoplastic film, and drawing an oxidizing atmosphere into the mold to keep the refractory material at a sufficiently oxidized state. This period of time can, e.g., range from about 15 minutes to about 60 minutes depending on the dimensions.

In this invention, the necessity for releasing the cast product from the mold under high temperatures is eliminated. Thus, the operations are easy, and further the cast product is free of fracture and contains substantially no scattered small pores immediately below its surface.

Figure 1A:
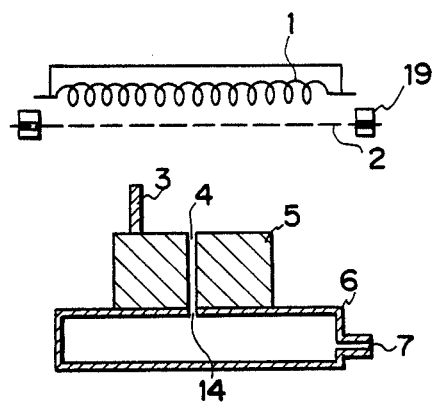
FIGS. 1A to 1E are a series of schematic explanatory views illustrating a method for manufacturing a fused cast refractory embodying this invention.

A method for manufacturing a fused cast refractory of this invention, in particular with reference to the drawings, is carried out as follows:

First, a wooden pattern 5 of predetermined dimensions as shown in FIG. 1A is prepared. A stand 6 having an exhaust port 7 and a vent hole 14 is prepared. The exhaust port 7 and vent hole 14 communicate with each other within the stand 6. On this stand 6, the wooden pattern 5 drilled with a hole 4 is mounted in such a manner that the hole 4 registers with the vent hole 14. On the wooden pattern 5, a sprue formation 3 is mounted. Above the wooden pattern 5, a thermoplastic film 2 and a heater 1 for heating the film 2 are located. The film 2 is supported by a film holder 19. As the thermoplastic film 2, polyethylene, polyvinyl chloride, ethylene vinyl acetate copolymer resin, polypropylene, polyvinyl alcohol, or the like is used.

Figure 1D:
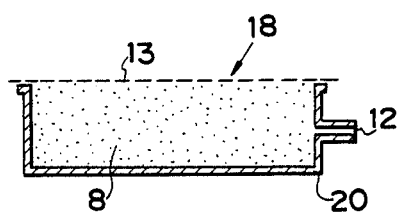
Figure 1B:
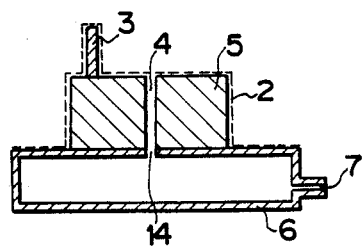

Referring to FIG. 1B, the exhaust port 7 is connected with a vacuum pump. While evacuating the interior of the stand 6, the thermoplastic film 2 is heated to be softened and placed on the wooden pattern 5. When suction is applied to the softened thermoplastic film 2, the vacuum acting through the hole 4 and the film therefore comes into an intimate contact with the wooden pattern 5.

Figure 1E:
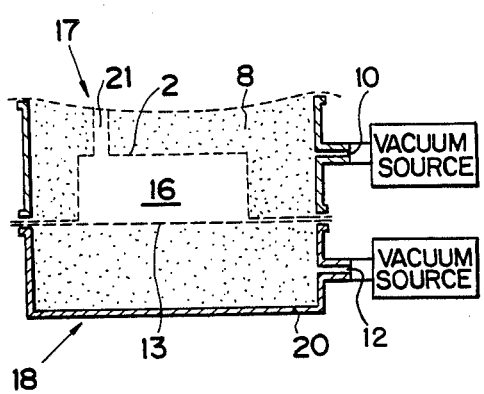
Figure 1C:
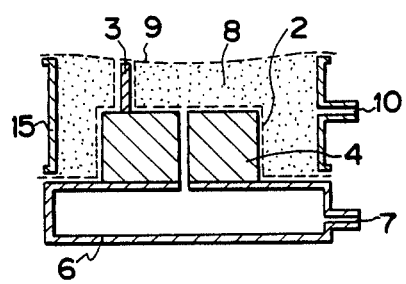

Referring to FIG. 1C, a casting frame 15 is mounted on the stand 6, and a casting sand 8 is densely filled in the space around the wooden pattern 5. The frame 15 is evacuated through an exhaust port 10 therein, and a softened thermoplastic film 9 is placed on the casting sand 8. The resultant negative pressure within the frame 15 causes the thermoplastic film 9 intimately to contact the casting sand 8, so that the casting sand 8 completely looses its fluidity. When this state is attained, the evacuation through the exhaust port 7 is stopped. Thereafter, the stand 6 is removed together with the wooden pattern 5 and the sprue formation 3. Because the evacuation through the exhaust portion 10 is continued, the casting sand 8 does not collapse and serves as an upper mold portion 17 (FIG. 1E) having a cavity 16 exactly corresponding in shape to that of the wooden pattern 5 and an inlet 21 corresponding in shape to that of the sprue formation 3. In this invention, the thermoplastic film may be alternatively formed by daubing or spraying a solution of polyvinyl alcohol or the like.

Referring now to FIG. 1D, another mold portion 18 is prepared in a similar fashion to the upper mold portion 17 but omitting the wooden pattern so that there is no mold cavity in the bottom mold portion 18. Obviously, the bottom mold portion could also be provided with a mold cavity, if desired. The bottom mold portion 18 comprises a frame 20 having an exhaust port 12 and a thermoplastic film 13 on the casting sand 8 filled into the frame 20.

The previously formed upper mold portion 17 is superposed on the bottom mold portion 18 as shown in FIG. 1E. Thus, the cavity 16 defined by the thermoplastic films 2 and 13 is also surrounded by the tightly packed casting sand 8.

Next, a molten refractory material which is fused in an electric arc furnace in a conventional manner is poured into the cavity 16 through the inlet 21 to effect casting. The vacuum pump is continuously operated to effect the evacuation through the exhaust ports 10 and 12. The thermoplastic films, which are held under suction prior to casting, are melted or burned off. Then the evacuation is stopped. The cast product is buried in sand to gradually cool for an adequate period of time. After the gradual cooling, the cast product is taken out of the sand. The number of foams per cm² produced by a test refractory in a glass sample having a diameter of 20 mm and a length of 5 mm is referred to as the "seeding potential". The test for this is carried out by calcining a sample refractory having a diameter of 40 mm and a length of 7 mm for 1 hour after which the glass sample is mounted on the calcined refractory, left there for 1 hour, and then cooled off outside the furnace.

The invention will be more clearly understood with reference to the following examples:

EXAMPLE 1

A procedure mentioned above is carried out. Thermoplastic film sheets 2, 9 and 13 each of 100 microns in thickness are used. As the casting sand 8, Freemantle silica sand from Australia is used, so as to form a mold having a cavity 16 of 100×300×450 mm in size. Under continuous evacuation, a molten alumina-zirconia-silica (AZS) refractory material which is fused in an electric arc furnace in a conventional manner is poured into the cavity 16 through the inlet 21 to effect casting. After the casting, the vacuum pump is continuously operated for 30 minutes to effect the evacuation through the exhaust ports 10 and 12. The thermoplastic film sheets under suction are melted or burned off. Then the evacuation is stopped. The cast product is buried in sand to cool off for three days. After the gradual cooling, the cast product is taken out of the sand. The cast product exhibits a light yellow surface and shows almost no burning or sticking of the casting sand or fracture formation. Also, a seeding potential and foaming characteristic in glass, which is a measure of its degree of oxidation state, is low. The casting silica sand used here contains no impurities and can be reclaimed repeatedly.

EXAMPLE 2

The procedure described above is carried out. Coarse-grained Bayer-processed alumina is used as the casting sand 8. A wooden pattern 5 of 100×300×450 mm in size is used to form a cavity 16 of the corresponding dimensions through a thermoplastic film of 100 microns in thickness under a negative pressure.

A molten alumina refractory material which is fused in an electric arc furnace in a conventional manner is poured and cast in the mold cavity 16 under continuous evacuation. After the casting, the refractory material is left under a negative pressure for several minutes. The thermoplastic film under suction is melted or burned off. Then the evacuation is stopped. Without releasing the cast product from the mold at high temperature, both the cast product and the mold comprising the coarse-grained Bayer-processed alumina as the casting sand are buried in fine-grained Bayer-processed alumina for gradual cooling.

Five days after the casting, the cast product is taken out of fine grained Bayer-processed alumina. The casting sand around the cast product has been collapsed and entirely lost its strength as the casting mold. Consequently, the cast product alone is easily withdrawn. The cast product has no fracture, and even when its surface is ground to the depth of about 3 mm, scattered small pores are not observed. Also, the intended product of improved quality can be produced at lower cost, without severe operations under high temperatures and the use of the expensive graphite plates.

The Glass-foaming characteristic tests were carried out with respect to a conventional alumina-zirconia-silica refractory (Comparative Example) and Examples 1 and 2 in this invention. The sample refractories having a diameter of 40 mm and a length of 7 mm were calcined at 1200° C. for one hour. Thereafter a glass sample having a diameter of 20 mm and a length of 5 mm was mounted on each of the refractories as calcined, and left there for an hour, followed by cooling off outside the furnace. As the glass sample, soda-lime glass was used. The number of foams formed in the glass sample was microscopically counted, and the foam number per unit area was calculated. The results are shown in Table 1.

TABLE 1

|  | Number of foams/cm² | |
|---|---|---|
|  | Surface | Interior |
| Example 1 | 8 | 7 |
| Example 2 | 0–1 | 0–1 |
| Comparative Example | 120 | 150 |

As is apparent from Table 1, Examples 1 and 2 are clearly superior to the Comparative Example in terms of the glass-foaming characteristic. Accordingly, the fused cast refractory produced by this invention is suitable for glass-melting furnaces, particularly for producing high quality glass.

What is claimed is:

1. A method for manufacturing an electrofused cast refractory article, comprising the steps of:
    in an oxidizing atmosphere, forming a casting mold having a mold cavity by outlining said cavity with a thermoplastic film and maintaining a casting sand surrounding said cavity by applying a negative pressure through said sand against said film, wherein said sand consists essentially of a silica sand or a Bayer-processed alumina, and wherein each individual sand particle is an aggregate of a large number of fine particles;
    pouring molten refractory material into said mold cavity to produce a cast refractory article;
    maintaining said negative pressure for a period of time following said pouring step while drawing an oxidizing atmosphere into the mold to keep said refractory material at a sufficiently oxidized state; and
    cooling the cast refractory article by burying it in sand corresponding to said casting sand.

2. A method according to claim 1, wherein the refractory material comprises an electrofused cast refractory which is fused in an arc furnace.

3. A method according to claim 1, wherein the refractory material is selected from the group consisting of alumina-zirconia-silica refractory; alumina refractory; and 4. A method according to claim 1, wherein said steps are carried out in an air atmosphere.

5. A method according to claim 1, wherein the alumina particles contain no more than about 10% by weight of aggregate particles of a size smaller than about 50 microns.

6. A method according to claim 1, wherein each of the particles of the casting sand comprises an aggregate of a large number of smaller particles.

7. A method according to claim 1, wherein the casting sand is of high purity.

8. A method according to claim 1, wherein the casting sand remains gas permeable when the casting sand forms the mold cavity under the negative pressure.

9. A method according to claim 1, wherein the casting sand has a heat insulation adequate to serve as a gradual cooling agent for the cast refractory after the casting.

10. A method according to claim 1, wherein said forming step comprises laying the thermoplastic film over a pattern, adding the casting sand over the thermoplastic film, applying the negative pressure through the casting sand against the thermoplastic film, and then removing the pattern from the thermoplastic film and the casting sand to form said mold cavity.

11. A method according to claim 10, wherein the thermoplastic plastic film is in a heat-plastified form when the thermoplastic film is laid over the pattern.

12. A method according to claim 1, wherein the thermoplastic material forming said film is selected from the group consisting of polyethylene, polyvinyl chloride, ethylene vinyl acetate copolymer resin, polypropylene, and polyvinyl alcohol.

13. A method for manufacturing an electrofused cast refractory article, comprising the steps of:
in an oxidizing atmosphere, forming a casting mold having a mold cavity by outlining said cavity with a thermoplastic film and maintaining a casting sand surrounding said cavity by applying a negative pressure through said sand against said film, wherein said sand consists essentially of a Bayer-processed alumina containing no more than about 50 microns in size;
pouring molten refractory material into said mold cavity to produce a cast refractory article;
maintaining said negative pressure for a period of time following said pouring step while drawing an oxidizing atmosphere into the mold to keep said refractory material at a sufficiently oxidized state; and cooling the cast refractory article.

* * * * *